(12) United States Patent
Chordia et al.

(10) Patent No.: US 7,722,771 B2
(45) Date of Patent: May 25, 2010

(54) CONTINUOUS PROCESSING AND SOLIDS HANDLING IN NEAR-CRITICAL AND SUPERCRITICAL FLUIDS

(75) Inventors: Lalit Chordia, Pittsburgh, PA (US); Jose L. Martinez, Gibsonia, PA (US); Bhishmakumar Desai, Pittsburgh, PA (US); Andrew Kegler, Ripon, WI (US)

(73) Assignee: Thar Technologies, Inc., Pittsburgh, PA (US)

( * ) Notice: Subject to any disclaimer, the term of this patent is extended or adjusted under 35 U.S.C. 154(b) by 1258 days.

(21) Appl. No.: 11/103,673

(22) Filed: Apr. 12, 2005

(65) Prior Publication Data

US 2005/0283010 A1    Dec. 22, 2005

Related U.S. Application Data

(60) Provisional application No. 60/561,305, filed on Apr. 12, 2004.

(51) Int. Cl.
    *B01D 11/00* (2006.01)
(52) U.S. Cl. .............. 210/634; 210/637; 210/638; 422/129; 422/198; 422/234; 422/242; 422/256; 427/445; 554/11; 554/16
(58) Field of Classification Search .......... 210/511, 210/634, 637, 639, 259, 806, 638; 209/1, 209/155; 426/425, 429, 489–492, 417; 554/9–20; 422/256–261, 129, 198, 234, 242; 196/14.52; 208/349, 311–317; 427/445
See application file for complete search history.

(56) References Cited

U.S. PATENT DOCUMENTS

| | | | |
|---|---|---|---|
| 2,281,865 A * | 5/1942 | Van Dijck | ............ 208/319 |
| 2,338,606 A | 6/1944 | Voorhees | |
| 4,094,651 A | 6/1978 | Donath | |
| 4,218,222 A | 8/1980 | Nolan, Jr. et al. | |
| 4,271,754 A | 6/1981 | Homann | |
| 4,357,865 A | 11/1982 | Knuth et al. | |
| 4,397,657 A | 8/1983 | Selep et al. | |
| 4,415,336 A | 11/1983 | Stasi et al. | |
| 4,467,713 A | 8/1984 | Kuth et al. | |
| 4,675,133 A | 6/1987 | Eggers et al. | |
| 4,783,010 A | 11/1988 | Kissel | |
| 5,041,245 A | 8/1991 | Benado | |

(Continued)

FOREIGN PATENT DOCUMENTS

DE    4216295    11/1993

(Continued)

OTHER PUBLICATIONS

Recente ontwikkelingen op het gebied van superkritische extractie, Feb. 1989, The Netherlands.

*Primary Examiner*—Joseph W Drodge
(74) *Attorney, Agent, or Firm*—David G. Oberdick; Meyer, Unkovic & Scott LLP

(57) ABSTRACT

The present invention provides methods and apparatuses for the continuous processing and solids handling in near-critical and supercritical fluids. The present invention also allows for treatment of the starting material with the near-critical or supercritical fluid. The remaining raffinate is then continuously transferred and may be collected in a barrier fluid.

34 Claims, 3 Drawing Sheets

U.S. PATENT DOCUMENTS

| | | | |
|---|---|---|---|
| 5,411,715 A | 5/1995 | Czekai et al. | |
| 5,630,911 A | 5/1997 | Kratochwill | |
| 5,707,673 A * | 1/1998 | Prevost et al. | 426/417 |
| 6,013,304 A | 1/2000 | Todd | |
| 6,262,285 B1 | 7/2001 | McDonald | |
| 6,279,250 B1 | 8/2001 | Anderson | |
| 6,509,051 B1 | 1/2003 | Wills | |
| 6,749,752 B2 * | 6/2004 | Trout | 210/259 |
| 2002/0134704 A1 | 9/2002 | Mitchell et al. | |
| 2003/0072867 A1 | 4/2003 | Anderson | |
| 2004/0225148 A1 | 11/2004 | Isogai et al. | |

FOREIGN PATENT DOCUMENTS

| | | |
|---|---|---|
| EP | 0156374 | 10/1985 |
| EP | 0338940 | 10/1989 |
| EP | 1000984 | 5/2000 |
| EP | 1004245 | 5/2000 |
| FR | 637386 | 4/1928 |
| GB | 166993 | 7/1921 |
| GP | 418107 | 10/1934 |
| JP | 03072939 | 3/1991 |
| JP | 2001046857 | 2/2001 |
| JP | 2002126490 | 5/2002 |

* cited by examiner

CONTINUOUS PROCESSING AND SOLIDS HANDLING IN NEAR-CRITICAL AND SUPERCRITICAL FLUIDS

CROSS-REFERENCE TO RELATED APPLICATION

This patent application claims priority from the U.S. provisional patent application of the same title, which was filed on Apr. 12, 2004 and assigned U.S. patent application Ser. No. 60/561,305.

BACKGROUND

The processing of solids using supercritical fluids is typically carried out by either batch or semi-continuous methods. In a production environment, these methods require an increased number of vessels, as well as large volumes. Additionally, batch processes are more time consuming and carry a higher risk of product contamination. There is also an increase in equipment fatigue due to pressurization and depressurization steps and supercritical fluid losses during the process. Because of these factors, supercritical fluid processing has been directed toward specialty products instead of commodity products. These disadvantages, however, may be overcome by the development of a continuous process for near-critical or supercritical fluids.

Supercritical fluids have gained wide acceptance in the past decade for their use in a number of processes. They are unique in the sense that density can be manipulated by simply changing pressure or temperature. Thus, all density-dependent properties are also varied. This makes supercritical fluids ideal candidates for extraction solvents. At a given set of conditions, a substance can be dissolved and extracted in the supercritical fluid. Once extracted, the extracted product can be separated from the supercritical fluid simply by modifying the thermodynamic properties of the fluid (changing temperature and/or pressure) or by a separating means such as an absorption column or an adsorption vessel. No further separation steps are necessary. Carbon dioxide is a popular supercritical fluid because it is nontoxic, inexpensive, and widely available. Another popular fluid that can be used is propane. Propane is also relatively inexpensive and can be used at low pressures.

A wide variety of solids can be processed using supercritical fluids such as various vegetable seeds, food ingredients, herbs, botanicals, solids contaminated with toxic organic material or pharmaceutical materials. By performing the extraction with a supercritical fluid, as opposed to an organic solvent, such as hexane, residual solvent levels are negligible and meet regulatory standards for both the food and pharmaceutical industries. Therefore, by developing a continuous process for solids that utilizes supercritical fluid technology, many advantages can be realized.

Some continuous processes for solids have been developed in the past, including U.S. Pat. No. 4,675,133 and U.S. Pat. No. 5,041,245. While these patents disclose continuous processes for the extraction of vegetable oil, a screw press was used in both instances to transfer the material into the vessel. While screw feeders are widely known in the art, they do possess certain limitations. In particular, a screw press typically imparts force upon the material and compacts it while moving it from one place to another. Extracting from a highly-compacted material can reduce yield and quality because the reduced surface area does not allow for intimate contact between the starting material and the extracting fluid. Additionally, a screw press has pressure limitations and requires a significant amount of energy input.

BRIEF SUMMARY OF THE INVENTION

One embodiment of the present invention comprises a method for introducing a solid starting material into a vessel containing a near-critical or supercritical fluid. The steps of this method embodiment comprise: (i) providing a loading zone; (ii) providing a restriction means between the loading zone and the vessel; (iii) loading the loading zone with the starting material; (iv) closing the loading zone to the environment; (v) equalizing the pressure in the loading zone with the vessel pressure; and (vi) transferring the starting material from the loading zone to the vessel through a mechanical conveying means.

Another embodiment of the present invention comprises a method for removing raffinate from a vessel containing a near-critical or supercritical fluid into an unloading zone. This method comprises: (i) providing a vessel with a raffinate; (ii) providing an unloading zone; (iii) providing a barrier fluid in the unloading zone to collect the raffinate; and (iv) removing the barrier fluid and the raffinate.

An additional embodiment of the present invention encompasses a method for the continuous processing of a starting material using a near-critical or supercritical fluid. Such method comprises: (i) loading a loading zone with the starting material; (ii) providing a vessel for treatment of the starting material; (iii) equalizing the pressure in the loading zone with the vessel pressure using the near-critical or supercritical fluid; (iv) introducing the starting material from the loading zone into the vessel under near-critical or supercritical conditions through a restriction means through a mechanical conveying means; (v) treating the starting material with the near-critical or supercritical fluid; and (vi) collecting raffinate in an unloading zone.

Another embodiment of the present invention comprises an apparatus for introducing a starting material into a vessel containing a near-critical or supercritical fluid. This apparatus comprises: (i) a loading zone; (ii) a restriction means between the loading zone and the vessel for equalizing the pressure between the loading zone and the vessel; (iii) a mechanical conveying means for transferring the starting material from the loading zone to the vessel; and (iv) a restriction means between the loading zone and the vessel through which the starting material enters the vessel.

Another embodiment of the present invention comprises an apparatus for removing raffinate from a vessel containing a near-critical or supercritical fluid into an unloading zone containing a barrier fluid in the unloading zone to collect the raffinate.

Another embodiment of the present invention comprises an apparatus for the continuous processing of a starting material using a near-critical or supercritical fluid. This apparatus comprises: (i) a loading zone; (ii) a mechanical conveying means for introducing the starting material from the loading zone into a vessel for treating the starting material under near-critical or supercritical conditions; (iii) a restriction means through which the starting material enters the vessel; (iv) a pressure equalization means between the loading zone and the vessel; and (v) an unloading zone for collecting the raffinate.

BRIEF DESCRIPTION OF THE DRAWINGS

For the present invention to be easily understood and readily practiced, the invention will now be described, for the purposes of illustration and not limitation, in conjunction with the following figures, wherein:

FIG. 1 is a schematic representation of one embodiment of the present invention for continuous processing and solids handling using a near-critical or supercritical fluid.

DETAILED DESCRIPTION

Figure 1:
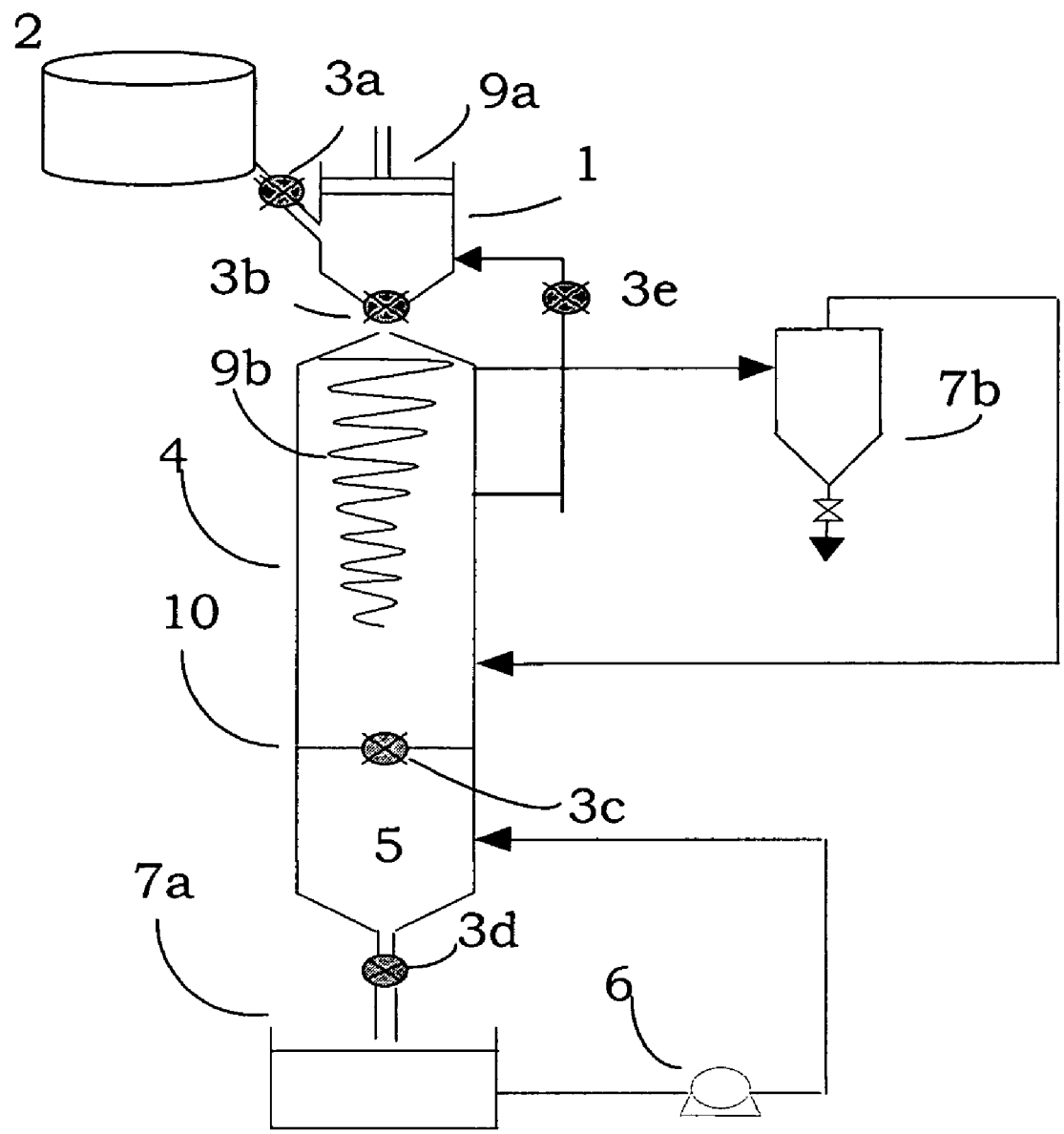

One embodiment of the present invention provides a method and apparatus for continuous processing and solids handling in near-critical and supercritical fluids. A starting material is transferred into a loading zone. The starting material is fed from a storage area, through a restriction means to load the loading zone. This can be accomplished by any suitable propelling means, including but not limited to gravity, a conveyor or the addition of a fluid. These examples are meant to illustrate some suitable propelling means, but are not intended to limit the scope of this invention. It will be obvious to one skilled in the art that a multitude of suitable propelling means and conveyors exist and all are encompassed by the scope of the present invention. In one embodiment of the present invention, the conveyor is a belt driver. In another embodiment of the present invention, the fluid may be the near-critical or supercritical fluid present in the vessel or a different fluid.

Once the loading zone is loaded, the starting material is transferred to a vessel through a restriction means by a mechanical conveying means. This process may be performed in a continuous or semi-continuous manner. In order to make the transfer of the starting material into the vessel more facile, the pressure in the loading zone may be equalized to the pressure of the vessel. Pressure equalization is accomplished by directing the near-critical or supercritical fluid in the vessel into the loading zone through a restriction means. Possible restriction means include but are not limited to a ball valve, check valve, gate valve, rotary valve, plug valve, a sealing mechanism, or any other device that satisfies the criteria for the restriction means and the mechanical conveying means may be a hydraulic or pneumatic piston or any other device that satisfies the criteria for the mechanical conveying means.

Using a hydraulic- or pneumatic-driven piston to load the starting material into the vessel provides several advantages. When a screw press is used, the material typically gets compacted, thus diminishing the amount of near-critical or supercritical fluid that can percolate into and through the material and extract any soluble substances. However, by using a hydraulic- or pneumatic-driven piston, the starting material gets less compacted, allowing for the near-critical or supercritical fluid to percolate into and through the starting material and extract the soluble substances more easily. A hydraulic- or pneumatic-driven piston can be used for a wide variety of starting materials. Because some starting materials do not have the characteristics required, such as flowability or heaviness, to be transferred to the vessel by means of gravity, a mechanical conveying means has to be employed.

In another embodiment of the present invention, a separate conveying means can be used within the vessel to control the transfer rate of the starting material through the vessel and thus, to control the contact time between the starting material and the near-critical or supercritical fluid. The separate conveying means within the vessel is controlled and may be driven from inside or outside of the vessel. The separate conveying means may be any device that serves the stated purpose. Some examples of possible separate conveying means, for the purpose of illustration and not limitation, include pneumatic, hydraulic, electric, magnetic, or a combination thereof.

The near-critical or supercritical fluid to be used in some embodiments of the present invention process includes, but is not limited to, ethane, propane, carbon dioxide, nitrous oxide, butane, isobutene, sulfur hexafluoride, water, hydrochlorofluorocarbons, hydrofluorocarbons, alkanes, or a combination thereof. However, the preferred near-critical or supercritical fluid is carbon dioxide or propane. In the vessel, the near-critical or supercritical fluid treats the starting material. The treatment is selected from the group consisting of extraction, reaction, coating, absorption, adsorption, or a combination thereof. In the preferred embodiments of the present invention, the temperature of the near-critical or supercritical fluid treatment is performed between 0° C. and 400° C. and pressure is between 10 bar and 1500 bar. In another embodiment of the present invention, more than one temperature zone is provided within the vessel.

In one embodiment of the present invention apparatus and method once the near-critical or supercritical fluid treats the starting material, the raffinate continuously enters an unloading zone, which is located at the bottom of the vessel or as a separate unit connected to the vessel, through a restriction means. For the purposes of this invention, the term raffinate refers to any of the material that is left in the vessel after treatment. In another embodiment of the present invention, there is no restriction means between the vessel and the unloading zone. In one embodiment of the present invention, the unloading zone contains a barrier fluid. The presence of the barrier fluid allows for the raffinate to be separated from the near-critical or supercritical fluid due to the low solubility of the near-critical or supercritical fluid in the liquid. Therefore, the barrier fluid is chosen such that it and the near or supercritical fluid are not substantially miscible with each other. However, the degree of miscibility is not a restriction in the way the invention is practiced. In some embodiments of the present invention, the barrier fluid may be selected from a group including water, alcohols, ethers, ketones, ionic liquids, any other fluid immiscible with the near-critical or supercritical fluid, or a combination thereof. It will be obvious to one skilled in the art that other barrier fluids may be used and the use of such other fluids is encompassed by the present invention. The raffinate is continuously removed from the vessel and collected. In some embodiments of the present invention, the barrier fluid is then recycled back to the vessel using a recirculation pump, which controls the barrier fluid level and keeps it constant. The raffinate is then removed from the barrier fluid using a hydro-cyclone or other separation means available in the art.

In another embodiment of the present invention apparatus and method, the barrier fluid can be used to further treat substances in the raffinate that are soluble in the barrier fluid. In these embodiments of the present invention, the barrier fluid extraction is performed between 0° C. and 400° C. and the pressure is equal to the pressure in the vessel. This enables the extraction of non-polar or low polarity components using the near-critical or supercritical fluid and polar components using the barrier fluid, or the reverse in which polar components can be extracted in the near-critical or supercritical fluid and non-polar or low polarity components can be extracted in the barrier fluid. In another embodiment, there are multiple heating zones in the vessel, providing the flexibility of treating the starting material at constant temperature or at different temperatures. Such capability may facilitate fractionation of the starting material.

In another embodiment of the present invention apparatus and method, once the near-critical or supercritical fluid treats the starting material, the raffinate is collected in the unloading zone and continuously or semi-continuously removed from it using a separate mechanical conveying system such as screw press. This embodiment would not expose the raffinate to any barrier fluid. In another embodiment, a conveyor or screw system may be coupled with collection in a barrier fluid. Once the raffinate is collected in the barrier fluid, a conveyor or screw can be used to move the raffinate to a separation collection means, such as a hydro-cyclone. The barrier fluid is recycled back to the unloading zone.

The near-critical or supercritical fluid containing any soluble substances leaves the vessel from the top. The soluble substances are then separated from the near-critical or supercritical fluid by modifying the pressure and/or temperature or by using external agents such as adsorption vessels or absorption columns. The soluble substances are then collected using a cyclone separator or other collection or separation means known in the art. The near-critical or supercritical fluid is recycled back to the vessel at subcritical or supercritical conditions.

In another embodiment of the present invention apparatus and method, the near-critical or supercritical fluid containing any soluble substances can be fractionated by several methods, including, but not limited to, a temperature gradient, sequential depressurization, means for adsorption or absorption, or a combination thereof.

In another embodiment of the present invention, the near-critical or supercritical fluid containing any soluble substances can be transferred to another column or vessel and undergo another treatment, such as a reaction. The reaction may be with another reactant or within the components present in the near-critical or supercritical fluid. The reaction may be of chemical, physical, biological, nuclear or enzymatic, or a combination thereof.

In one embodiment of the present invention, the loading zone, vessel, and unloading zone are contained in one unit. Therefore, the transfer of the starting material from the loading zone to the vessel, treatment of the starting material in the vessel, and collection and/or removal of the raffinate can all be carried out in a single unit.

In another embodiment of the present invention, the loading zone, vessel, and unloading zone are contained in separate units. The loading zone is in contact with the vessel through a restriction means, and the vessel is in contact with the unloading zone through a restriction means. There is no limitation to the axial orientation of any of the zones in the present invention.

FIG. 1 illustrates one embodiment of the present invention for the continuous processing of solids using near-critical or supercritical fluids. A starting material is transferred to the loading zone (1) from a storage tank (2) through a restriction means (3a). Once the loading zone (1) is loaded, the starting material is transferred into the vessel (4) through a restriction means (3b). Different restriction mechanisms, such as a check valve, ball valve, rotary valve or seal, may be used, but there is no limitation on the restriction means. The restriction means may be driven from inside or outside of the loading zone (1). A mechanical conveying means (9a) such as a piston is used to transfer or facilitate the transfer of the starting material into the vessel (4). An additional means of facilitating the transfer of the starting material to the vessel (4) is to equalize the pressure in the loading zone (1) through a restrictions means (3e) with the near-critical or supercritical fluid itself or another fluid to the pressure in the vessel (4). A mechanical conveying means (9b) located inside the vessel (4) is used to control the transfer rate of the starting material through the vessel (4). The mechanical conveying means (9b) may extend the entire length of the vessel (4) or may be used in only certain sections, such as from between the restriction means (3b) to a barrier fluid (5) in the unloading zone (10). In a preferred embodiment, the mechanical conveying means (9b) can be of pneumatic, electric, magnetic or hydraulic type and may be driven from inside or outside of the vessel (4). In another embodiment, a screw press may be used to accomplish the same effect. Once the starting material is treated with the near-critical or supercritical fluid, the raffinate moves through a restriction means (3c) into the barrier fluid (5) at the bottom of the unloading zone (10). The raffinate, which is continuously removed from the unloading zone (10) through a restriction means (3d), is then separated from the barrier fluid (5) using a separating means (7a). In one embodiment of the present invention, a hydrocyclone is used as the separating means (7a). However, various separation means known in the art can also be used. The barrier fluid (5) is recycled back to the unloading zone (10) using a recirculation means (6). The near-critical or supercritical fluid containing one or more soluble substances leaves the vessel (4) and the soluble substances are separated from the near-critical or supercritical fluid using a separating means (7b). Separation of the soluble substances from the near-critical or supercritical fluid can be accomplished by various methods. Manipulation of thermodynamic properties such as temperature and pressure, addition of external agents, membrane separation, adsorption, absorption and other techniques known in the art may be used for this purpose. The soluble substances can be recovered in the separating means (7b) and the near-critical or supercritical fluid can be recycled back to the vessel (4). In another embodiment of the invention, a screw press can be used to remove the raffinate from the vessel (4) with or without the use of a barrier fluid.

Figure 2:
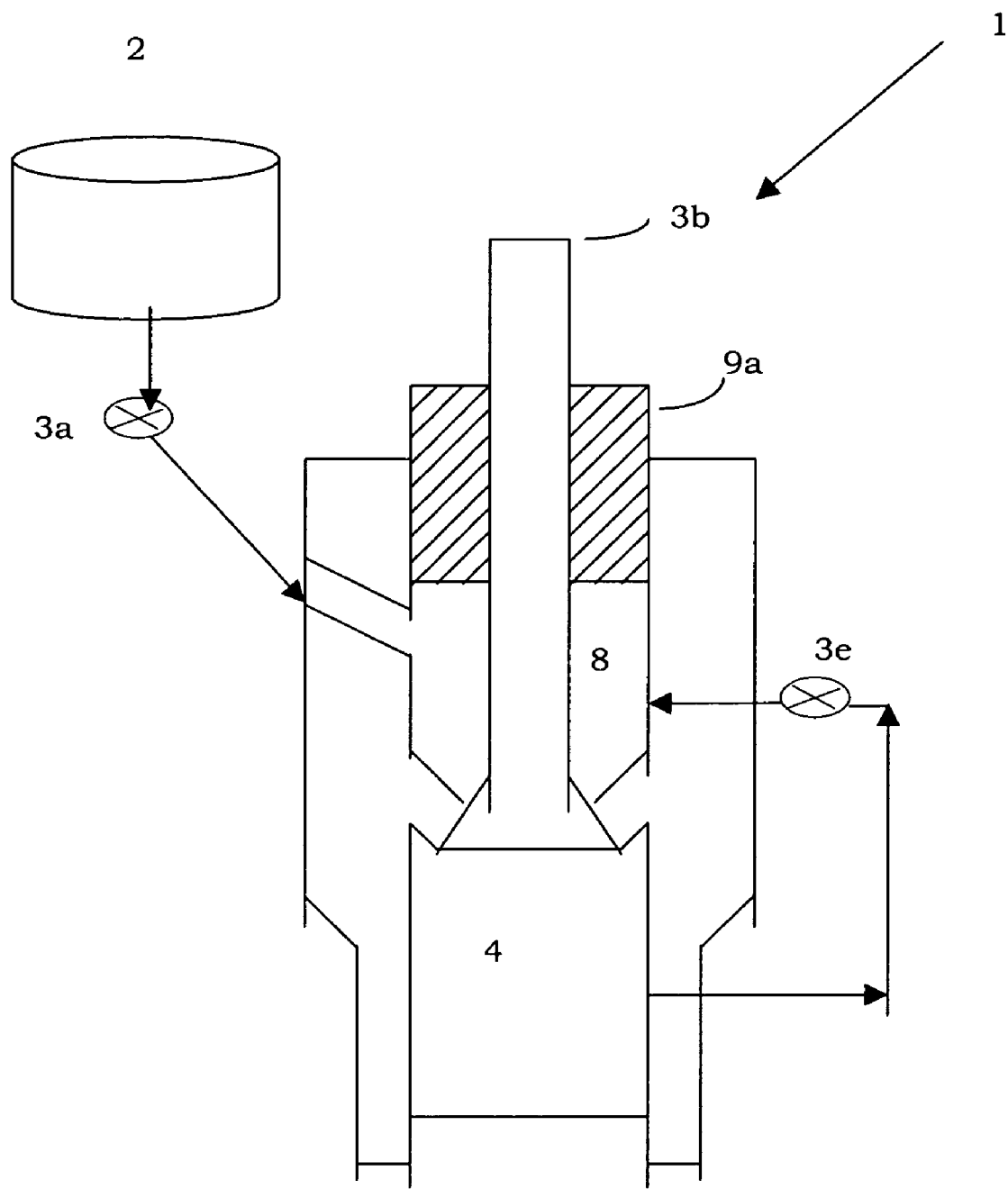
FIG. 2 is a schematic representation of the loading zone used to transfer the starting material into the vessel.

FIG. 2 illustrates one embodiment of the loading zone (1) of the present invention. A starting material is transferred into the loading zone (1) from a storage tank (2) through a restriction means (3a). The starting material enters an enclosed space (8) in the loading zone (1) beneath a mechanical conveying means (9a). A restriction means (3b) is in a position such that the enclosed space (8) is closed off from the vessel (4). The mechanical conveying means (9a) is then moved to a position to close off the enclosed space (8) from the point of entry of the starting material into the loading zone (1). A restriction means (3e) is then opened to allow entry of the near-critical or supercritical fluid in the vessel (4) into the enclosed space (8), which results in pressure equalization between the vessel (4) and the enclosed space (8). Once the pressure is equalized, the restriction means (3b) is adjusted to allow entry of the starting material into the vessel (4). The mechanical conveying means (9a) is then lowered to facilitate transfer of the starting material into the vessel (4) and to return the near-critical or supercritical fluid to the vessel (4). Any residual near-critical or supercritical fluid that is left in the enclosed space (8) can be vented to the atmosphere.

Figure 3:
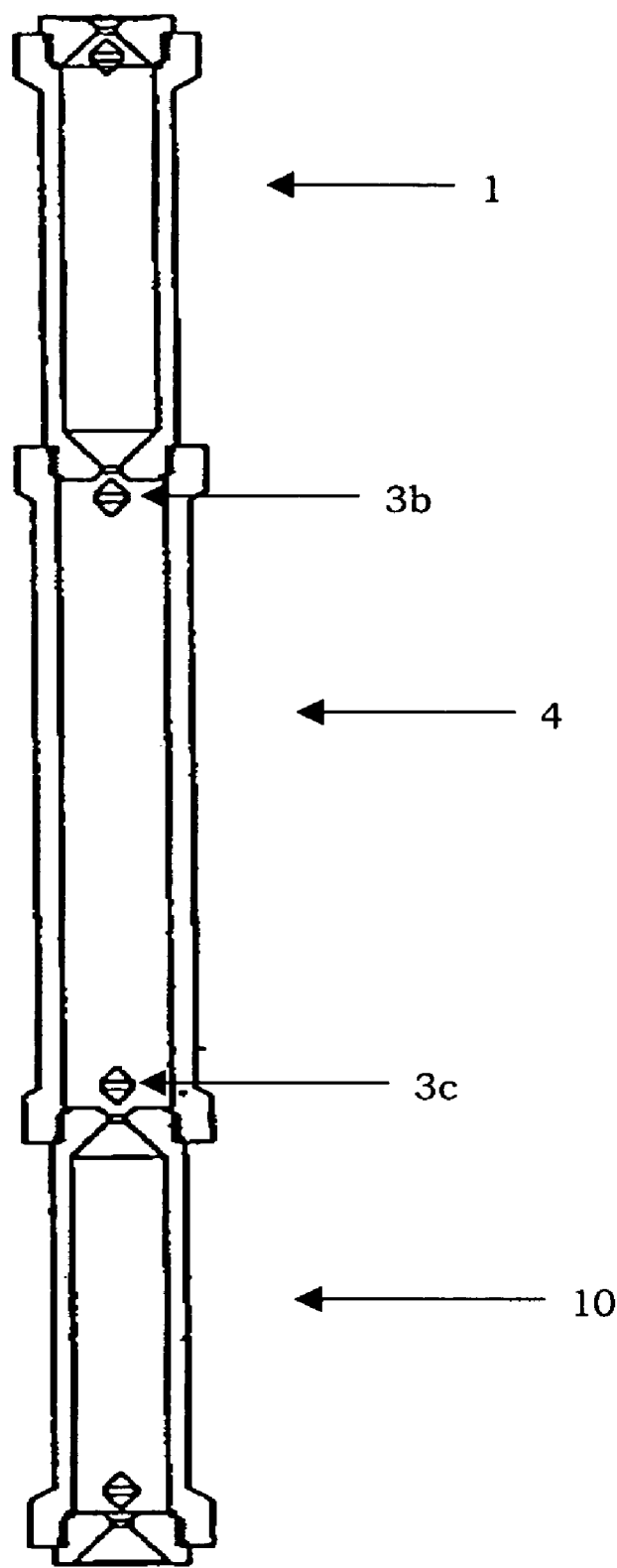
FIG. 3 is a schematic representation of one embodiment of the present invention in which the loading zone, vessel and unloading zone are contained in separate units.

FIG. 3 illustrates an embodiment of the present invention in which the loading zone (1), vessel (4), and unloading zone (10) are each contained in separate units. The loading zone (1) is in contact with the vessel (4) through a restriction means (3b), and the vessel (4) is in contact with the unloading zone (10) through a restriction means (3c). There is no limitation to the axial orientation of any of the zones in the present invention.

The above-provided discussion of various embodiments of the present invention is intended to be an illustrative, but not exhaustive, list of possible embodiments. It will be obvious to one skilled in the art that other embodiments are possible and are included within the scope of this invention.

We claim:

1. A method for the continuous processing of a starting material using a first near-critical or supercritical fluid comprising:
   a. loading a loading zone with said starting material;
   b. providing a vessel having a treatment zone for treatment of said starting material;
   c. equalizing the pressure in said loading zone with the vessel pressure using said near-critical or supercritical fluid;
   d. introducing said starting material from said loading zone into said vessel under near-critical or supercritical conditions through a restriction means by a mechanical conveying means;
   e. treating said starting material with said near-critical or supercritical fluid; and
   f. collecting raffinate in an unloading zone, wherein the unloading zone contains a second fluid that is substantially immiscible with the near critical or supercritical fluid and is separated from said treatment zone by a restriction means.

2. The method of claim 1, wherein said raffinate is removed from said unloading zone by a screw press.

3. The method of claim 1, wherein said second fluid is used to treat said raffinate.

4. The method of claim 1, wherein said raffinate and said second fluid are removed from said unloading zone.

5. The method of claim 1, wherein said raffinate is removed from said second fluid.

6. The method of claim 1, wherein said second fluid is recycled back to said unloading zone.

7. The method of claim 1, wherein said mechanical conveying is accomplished by the movement of a piston.

8. The method of claim 1, wherein said mechanical conveying is accomplished by the movement of a screw.

9. The method of claim 1, wherein said restriction means are each selected from the group consisting of a ball valve, a check valve, a gate valve, a rotary valve, and a plug valve.

10. The method of claim 1, wherein said starting material is selected from the group consisting of a natural source material, vegetable seeds, herbs, botanicals, synthetic material, contaminated solids, pharmaceutical material and a combination thereof.

11. The method of claim 1, wherein said near-critical or supercritical fluid is selected from the group consisting of ethane, propane, carbon dioxide, nitrous oxide, butane, isobutene, sulfur hexafluoride, water, hydrochlorofluorocarbons, hydrofluorocarbons, alkanes, and a combination thereof.

12. The method of claim 1, wherein said starting material is continuously transferred into said vessel.

13. The method of claim 1, wherein said raffinate is continuously collected.

14. The method of claim 1, wherein said raffinate is continuously removed from said unloading zone.

15. The method of claim 1, wherein said near-critical or supercritical fluid is recycled.

16. The method of claim 15, wherein said near-critical or supercritical fluid is recycled under supercritical conditions.

17. The method of claim 15, wherein said near-critical or supercritical fluid is recycled under subcritical conditions.

18. The method of either claim 1 or claim 3, wherein said treating is selected from the group consisting of extraction, reaction, coating, absorption, adsorption, and a combination thereof.

19. The method of claim 18, wherein said treating occurs in a temperature range of 0° C. to 400° C.

20. The method of claim 18, wherein said treating occurs at a pressure in the range of 10 bar to 1500 bar.

21. The method of claim 1, wherein said starting material is transferred within said vessel by an additional mechanical conveying means.

22. The method of claim 1 or 21, wherein said conveying means is controlled.

23. The method of claim 22, wherein said conveying means is driven from inside said vessel.

24. The method of claim 22, wherein said conveying means is driven from outside said vessel.

25. The method of either claim 23 or claim 24, wherein said conveying means is driven by one of the means selected from the group consisting of pneumatic, hydraulic, electric, magnetic, and a combination thereof.

26. The method of claim 1, wherein said second fluid level in said unloading zone is controlled.

27. The method of claim 1, wherein substances in said starting material that are soluble in said near-critical or supercritical fluid are fractionated.

28. The method of claim 27, wherein said fractionation is facilitated by a means selected from the group consisting of a temperature gradient, sequential depressurization, means for adsorption, means for absorption, and a combination thereof.

29. The method of claim 1, wherein said near-critical or supercritical fluid and said substances in said starting material that are soluble in said near-critical or supercritical fluid are transferred to another vessel to undergo a reaction.

30. The method of claim 1, wherein more than one temperature zone is provided in said vessel.

31. The method of claim 1, wherein said second fluid is selected from the group consisting of water, alcohols, ethers, ketones, ionic liquids, any other fluid that is immiscible with the near critical or supercritical fluid, and a combination thereof.

32. The method of claim 1, wherein a screw press removes said raffinate and said second fluid from the unloading zone.

33. The method of claim 1, wherein steps (a) through (f) are carried out in a single unit.

34. The method of claim 1, wherein steps (a) through (f) are carried out in more than one unit.

* * * * *